(No Model.)
H. G. WILLIAMS.
STUFFING BOX.
No. 517,509. Patented Apr. 3, 1894.
FIG_1_
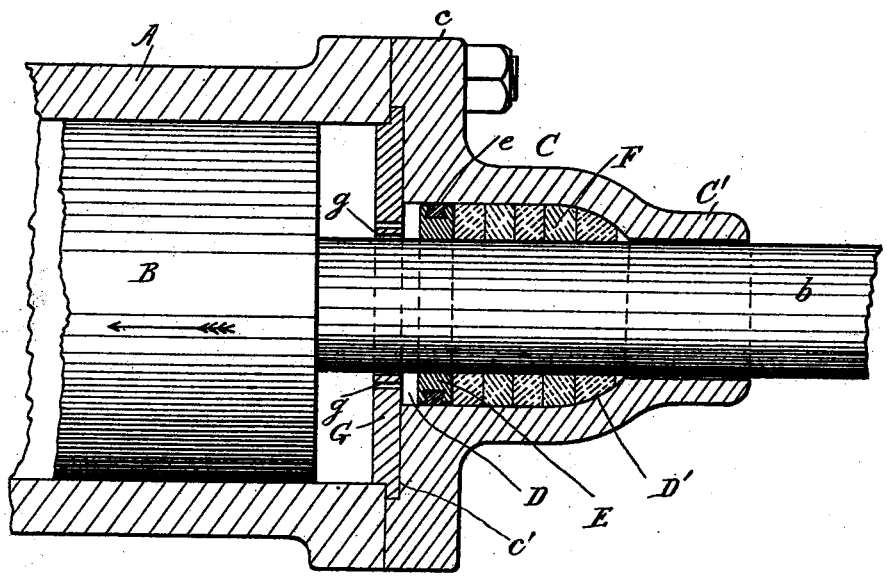
FIG_2_
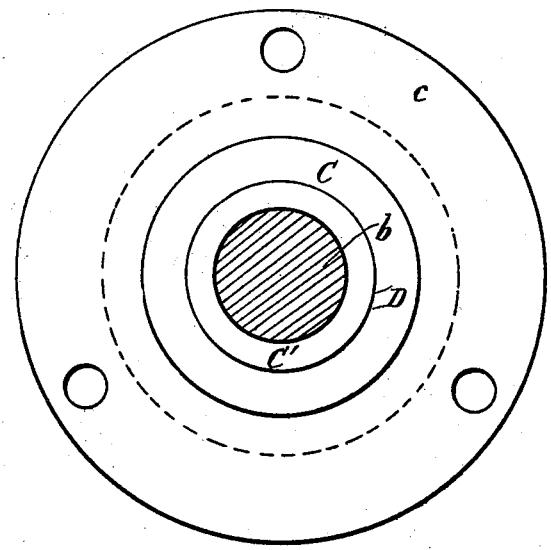
WITNESSES
INVENTOR
Horace G. Williams
by Herbert W. T. Jenner.
Attorney
THE NATIONAL LITHOGRAPHING COMPANY,
WASHINGTON, D. C.

UNITED STATES PATENT OFFICE.

HORACE GUERNSEY WILLIAMS, OF LYKENS, PENNSYLVANIA.

STUFFING-BOX.

SPECIFICATION forming part of Letters Patent No. 517,509, dated April 3, 1894.

Application filed December 15, 1893. Serial No. 493,738. (No model.)

*To all whom it may concern:*

Be it known that I, HORACE GUERNSEY WILLIAMS, a citizen of the United States, residing at Lykens, in the county of Dauphin and State of Pennsylvania, have invented certain new and useful Improvements in Stuffing-Boxes; and I do hereby declare the following to be a full, clear, and exact description of the invention, such as will enable others skilled in the art to which it appertains to make and use the same.

This invention relates to stuffing boxes; and it consists in the novel construction and combination of the parts hereinafter fully described and claimed whereby the packing is automatically pressed upon the rod.

In the drawings: Figure 1 is a longitudinal section through a stuffing box constructed according to this invention; and Fig. 2 is an end view of the same.

A is a portion of the motor cylinder of a rock drill, or it may be any other motor cylinder in which a fluid is confined under pressure.

B is the piston and $b$ is the piston rod.

C is the stuffing box which is rigidly secured to the cylinder, and which in this instance forms also the end cover of the cylinder, but the cylinder may have a separate cover if desired and the stuffing box may be secured to the cover in any approved manner.

The stuffing box consists of a cap made in a single piece and provided with a flange $c$ at one end for attaching it to the cylinder.

The stuffing box has a recess $c'$ in its face a little larger in diameter than the diameter of the cylinder, and a tubular portion $C'$ at its free end for the piston rod to slide in.

The stuffing box C is provided with a cylindrical chamber D which has a conical end portion $D'$. This chamber is arranged between the recess $c'$ and the tubular portion $C'$.

E is a collar which slides upon the piston rod inside the said chamber D. The collar E may be provided with a packing ring $e$ if desired, but if the collar is accurately fitted to the chamber this packing ring may be dispensed with.

F is the piston rod packing, which may be of any approved material ordinarily used for that purpose.

G is a plate secured between the cylinder and the stuffing box, and provided with one or more passages $g$ so that the compressed air inside the cylinder may press against the collar E. This plate prevents the collar from being moved out of the chamber when the rod is pressed back and there is no pressure of air or steam in the cylinder. When compressed air is admitted to the cylinder, and forces the piston backward in the direction of the arrow in the drawings, the collar is forced automatically against the packing in the chamber and the conical end portion $D'$ causes the packing to press upon the piston rod so that no air can escape. When the piston moves in the reverse direction the friction of the piston rod against the packing keeps the packing in its place, although there is no pressure in the cylinder and the collar is not pressed upon the packing.

What I claim is—

A stuffing box, consisting of a cap provided at one end with the flange $c$ and the recess $c'$, a tubular portion $C'$ at its other end, and the cylindrical chamber D having a conical end portion $D'$; in combination, with the collar sliding in the said chamber, and the plate G let into the said recess and provided with a hole $g$ communicating with the said chamber, substantially as set forth.

In testimony whereof I affix my signature in presence of two witnesses.

HORACE GUERNSEY WILLIAMS.

Witnesses:
J. L. BRALLIER,
W. C. PATTERSON.